(12) United States Patent
Ogawa et al.

(10) Patent No.: US 11,340,891 B2
(45) Date of Patent: May 24, 2022

(54) CONTROL DEVICE, CONTROL METHOD, AND COMPUTER PROGRAM

(71) Applicant: Sumitomo Electric Industries, Ltd., Osaka (JP)

(72) Inventors: Akihiro Ogawa, Osaka (JP); Hirofumi Urayama, Osaka (JP); Tatsuya Izumi, Osaka (JP); Takayuki Nakano, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 338 days.

(21) Appl. No.: 16/611,442

(22) PCT Filed: May 28, 2018

(86) PCT No.: PCT/JP2018/020277
§ 371 (c)(1),
(2) Date: Nov. 6, 2019

(87) PCT Pub. No.: WO2018/230314
PCT Pub. Date: Dec. 20, 2018

(65) Prior Publication Data
US 2021/0011711 A1    Jan. 14, 2021

(30) Foreign Application Priority Data
Jun. 15, 2017    (JP) .............................. JP2017-117833

(51) Int. Cl.
*G06F 8/656*    (2018.01)
*B60R 16/023*    (2006.01)
(Continued)

(52) U.S. Cl.
CPC ............ *G06F 8/656* (2018.02); *B60R 16/023* (2013.01); *H04L 67/12* (2013.01); *H04L 67/34* (2013.01);
(Continued)

(58) Field of Classification Search
CPC ... G06F 8/656; G06F 8/62; G06F 8/65; B60R 16/023; H04L 67/12; H04L 67/34; B60W 50/00; B60W 2050/0083
(Continued)

(56) References Cited

U.S. PATENT DOCUMENTS 3,671,727 A * 6/1972 Rhoades ............ G05B 19/4163
318/561
6,334,080 B1 * 12/2001 Iwai ...................... B60W 50/00
701/1
(Continued)

FOREIGN PATENT DOCUMENTS

JP    2015-037938 A    2/2015

OTHER PUBLICATIONS

Fujimoto, Richard, et al. "Ad hoc distributed simulations." 21st International Workshop on Principles of Advanced and Distributed Simulation (PADS'07). IEEE, 2007.pp. 1-8 (Year: 2007).*
(Continued)

*Primary Examiner* — Satish Rampuria
(74) *Attorney, Agent, or Firm* — Baker Botts L.L.P.; Michael A. Sartori

(57) ABSTRACT

A control device according to this disclosure includes: a communication unit configured to communicate with an on-vehicle control device via an in-vehicle communication line; and a control unit configured to control the communication unit. The control unit executes: an acquisition process of acquiring a first time and a second time described below; and a determination process of determining, based on a result of comparison between the first time and the second
(Continued)

time that have been acquired, whether or not rollback to a control program before update is necessary in the on-vehicle control device that is updating the control program. First time: a time from a present time in which the control program is being updated to when the update is completed Second time: a time from the present time to when the rollback to the control program before update is completed.

11 Claims, 10 Drawing Sheets

(51) Int. Cl.
*H04L 67/12* (2022.01)
*H04L 67/00* (2022.01)
*B60W 50/00* (2006.01)

(52) U.S. Cl.
CPC ..... *B60W 50/00* (2013.01); *B60W 2050/0083* (2013.01)

(58) Field of Classification Search
USPC .................................................. 717/168–178
See application file for complete search history.

(56) References Cited

U.S. PATENT DOCUMENTS

| | | | |
|---|---|---|---|
| 2013/0132939 A1* | 5/2013 | Murata | H02J 7/04 717/173 |
| 2015/0169311 A1* | 6/2015 | Dickerson | G06F 8/65 717/170 |
| 2016/0231996 A1* | 8/2016 | Tamura | H04N 7/15 |

OTHER PUBLICATIONS

Prvulovic, Milos, Zheng Zhang, and Josep Torrellas. "ReVive: Cost-effective architectural support for rollback recovery in shared-memory multiprocessors." ACM SIGARCH Computer Architecture News 30.2 (2002): pp. 111-122. (Year: 2002).*
Koscher, Karl, et al. "Experimental security analysis of a modern automobile." 2010 IEEE symposium on security and privacy. IEEE, 2010.pp. 447-462 (Year: 2010).*
Graham, Scott, Girish Baliga, and P. R. Kumar. "Abstractions, architecture, mechanisms, and a middleware for networked control." IEEE Transactions on Automatic Control 54.7 (2009): pp. 1490-1503. (Year: 2009).*
Wu, Ye, et al. "On-road vehicle emission control in Beijing: past, present, and future." (2011): pp. 147-153. (Year: 2011).*

* cited by examiner

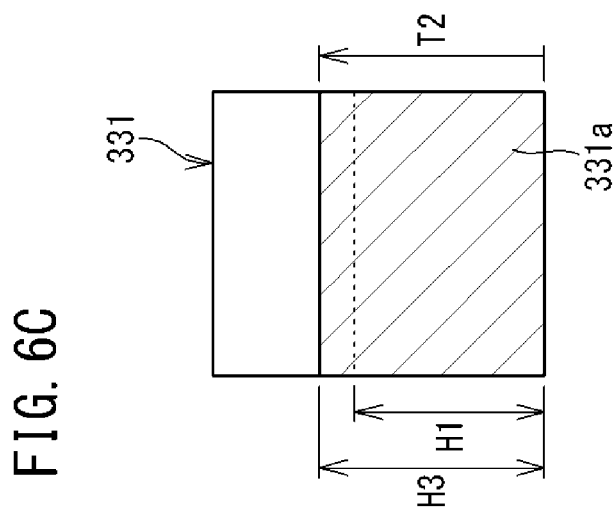
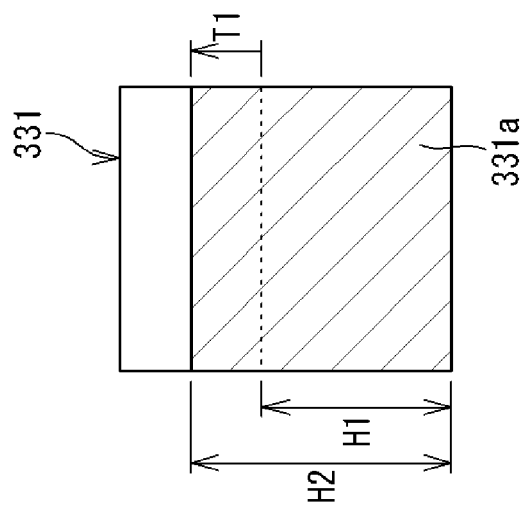
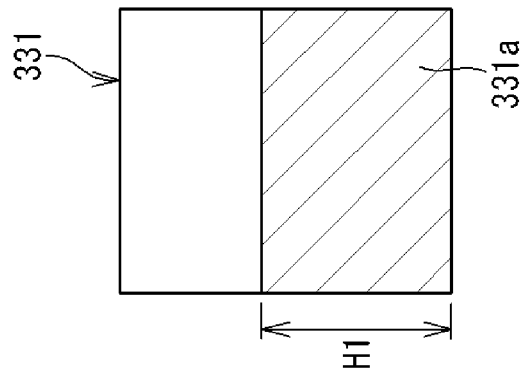

UPDATING ···

PLEASE DO NOT START THE VEHICLE
　　BECAUSE THE VEHICLE IS IN THE
　　MIDDLE OF UPDATING.
　　PLEASE WAIT FOR X MIN.
　　BEFORE UPDATE IS COMPLETED.

CONTROL DEVICE, CONTROL METHOD, AND COMPUTER PROGRAM

TECHNICAL FIELD

The present invention relates to a control device, a control method, and a computer program.

This application claims priority on Japanese Patent Application No. 2017-117833 filed on Jun. 15, 2017, the entire contents of which are incorporated herein by reference.

BACKGROUND ART

For example, Patent Literature 1 discloses a technology (online update function) of updating a program by using a program for update that is downloaded through a network.

CITATION LIST

Patent Literature

PATENT LITERATURE 1: Japanese Laid-Open Patent Publication No. 2015-37938

SUMMARY OF INVENTION

According to one embodiment, a control device according to the present disclosure includes: a communication unit configured to communicate with an on-vehicle control device via an in-vehicle communication line; and a control unit configured to control the communication unit. The control unit executes: an acquisition process of acquiring a first time and a second time described below; and a determination process of determining, based on the result of comparison between the first time and the second time that have been acquired, whether or not rollback to a control program before update is necessary in the on-vehicle control device that is updating the control program.

First time: a time from a present time in which the control program is being updated to when the update is completed Second time: a time from the present time to when the rollback to the control program before update is completed According to another embodiment, a control method according to the present disclosure is a method for controlling update of a control program in an on-vehicle control device by a control device that communicates with the on-vehicle control device via an in-vehicle communication line. The method includes: acquiring a first time and a second time described below; and determining, based on the result of comparison between the first time and the second time that have been acquired, whether or not rollback to a control program before update is necessary in the on-vehicle control device that is updating the control program.

First time: a time from a present time in which the control program is being updated to when the update is completed Second time: a time from the present time to when the rollback to the control program before update is completed According to still another embodiment, a computer program according to the present disclosure is a computer program configured to cause a computer to function as a control device that communicates with an on-vehicle control device via an in-vehicle communication line. The computer program causes the computer to function as: an acquisition unit configured to acquire a first time and a second time described below; and a determination unit configured to determine, based on a result of comparison between the first time and the second time that have been acquired, whether or not rollback to a control program before update is necessary in the on-vehicle control device that is updating the control program.

First time: a time from a present time in which the control program is being updated to when the update is completed Second time: a time from the present time to when the rollback to the control program before update is completed

BRIEF DESCRIPTION OF DRAWINGS

FIG. 6A to FIG. 6C are diagrams for explaining an update completion time and a rollback time.

DESCRIPTION OF EMBODIMENTS

Technical Problem

Figure 1:
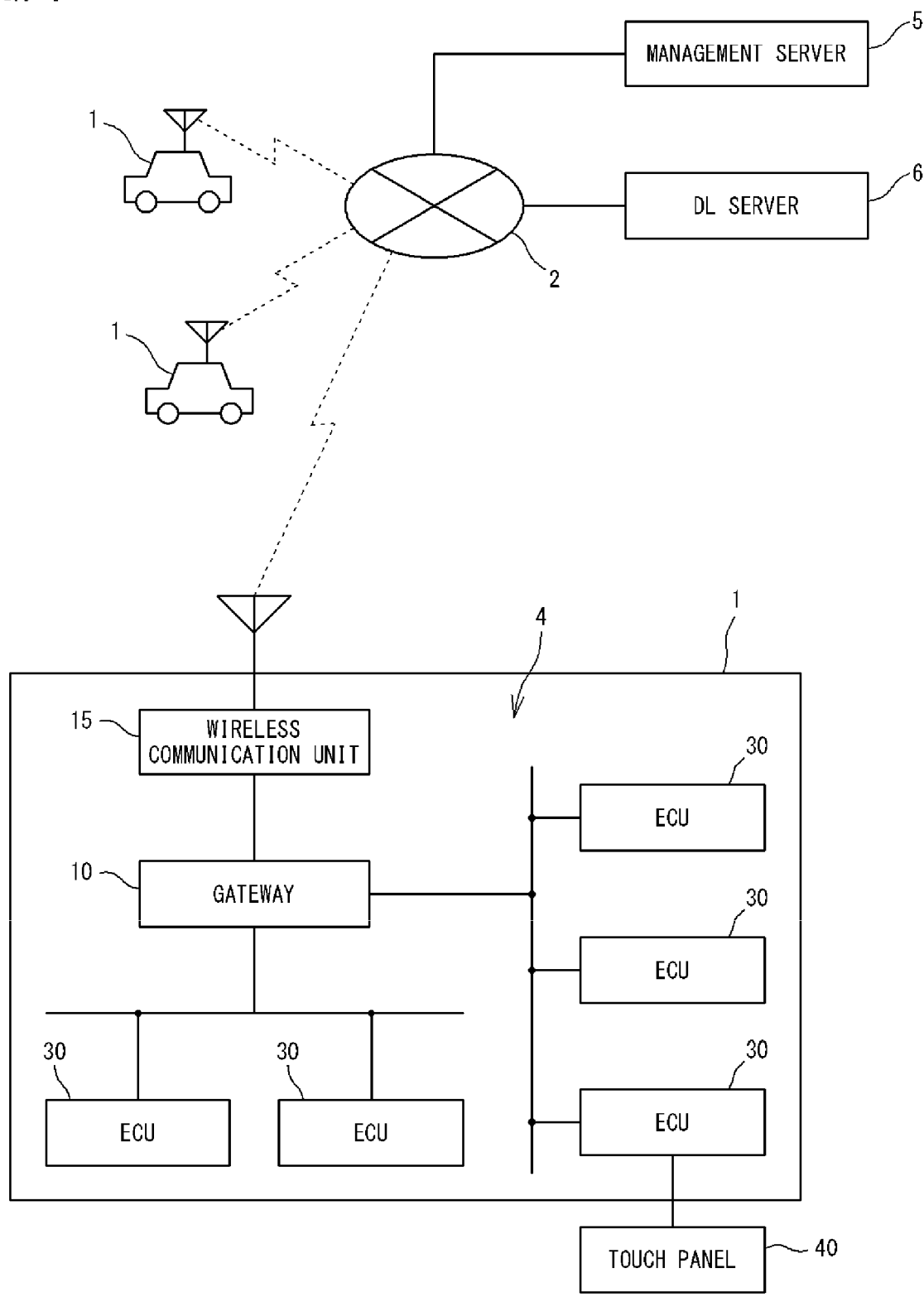
FIG. 1 is a diagram showing an overall configuration of a program updating system.

In the automotive field in recent years, vehicles have become advanced in functionality, and a diverse range of devices are installed in vehicles. Accordingly, vehicles are equipped with large numbers of control devices, so-called ECUs (Electronic Control Units), for controlling these on-vehicle devices.

Various types of ECUs have been adopted, such as ECUs regarding traveling that control an engine, a brake, an EPS (Electric Power Steering), and the like in response to operations on an accelerator, a brake, and a handle, body-type ECUs that control ON/OFF of interior lights and headlights, sound of an alarm unit, and the like in response to switch operations performed by an occupant, and meter-type ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions thereof in response to upgrading of the control programs. In addition, data, such as map information and control parameters, necessary for execution of the control programs also need to be overwritten.

As described in Patent Literature 1, if an ECU to be subjected to online update is an ECU regarding traveling or an ECU that causes a user interface to change during traveling, the online update is not permitted while the vehicle is traveling and is permitted only while the vehicle is stopped. Therefore, if online update is executed while the vehicle is stopped, the user may not be able to start traveling at his/her desired timing.

An object in one aspect of the present disclosure is to provide a control device, a control method, and a computer program which manage online update so as to be executed without impairing convenience of the user.

Advantageous Effects of Invention

According to the present disclosure, online update can be executed without impairing convenience of the user.

DESCRIPTION OF EMBODIMENTS

Embodiments of the present disclosure include at least the following.

(1) A control device included in the present embodiments includes: a communication unit configured to communicate with an on-vehicle control device via an in-vehicle communication line; and a control unit configured to control the communication unit. The control unit executes: an acquisition process of acquiring a first time and a second time described below; and a determination process of determining, based on a result of comparison between the first time and the second time that have been acquired, whether or not rollback to a control program before update is necessary in the on-vehicle control device that is updating the control program.

First time: a time from a present time in which the control program is being updated to when the update is completed Second time: a time from the present time to when the rollback to the control program before update is completed Since whether or not rollback is necessary is determined based on the result of comparison between the first time and the second time, a vehicle can be brought into the state where it can travel at an appropriate timing as compared to the case where the update process is uniformly continued or the case where the rollback is performed.

(2) Preferably, in a case where the first time is longer than the second time, the control unit determines that the rollback is necessary.

Thus, the vehicle can be brought into the state where it can travel, earlier than completion of the update process. Therefore, when there is a user who wants to start the vehicle during the update process, the request of the user can be satisfied.

(3) Preferably, the communication unit is able to receive a signal that indicates a user operation performed on a user interface. In the case where the result of the determination process is that rollback is necessary, the control unit further causes the communication unit to transmit an instruction that causes the on-vehicle control device to execute the rollback, subject to the content of the user operation.

Thus, the rollback can be executed with the user's intention being reflected therein.

(4) Preferably, the user operation includes a vehicle start operation of instructing start of the vehicle during update of the control program. The control unit executes the determination process when the vehicle start operation is performed, and determines that the rollback is necessary, in the case where the first time at the time point when the vehicle start operation has been performed is longer than the second time.

Thus, when there is a user who wants to start the vehicle during the update process, the request of the user can be satisfied.

(5) Preferably, the user operation further includes an instruction operation of instructing the rollback. In the case where the result of the determination process is that the rollback is necessary and the instruction operation has been performed, the control unit causes the communication unit to transmit an instruction that causes the on-vehicle control device to execute the rollback.

Thus, the rollback can be executed while the user's intention, as to which of start of the vehicle and update of the control program should be preferentially performed, is reflected therein. Therefore, if the user desires to preferentially perform update of the control program even if start of the vehicle is delayed, this request of the user can be satisfied.

(6) Preferably, the communication unit is able to transmit information for display to a display device. The control unit causes the communication unit to transmit an instruction that causes the display device to display the first time.

Thus, the user can know the time required to complete update of the control program. Therefore, when start of the vehicle is suspended during update of the control program, the user can know the time during which start of the vehicle is suspended.

(7) Preferably, in the case where the first time is longer than the second time, the control unit causes the communication unit to transmit an instruction that causes the display device to display the first time.

Thus, when update of the control program takes a longer time than completion of the rollback, the user can know the time required to complete update of the control program.

(8) Preferably, in at least one of a case where each of the first time and the second time is equal to or longer than a predetermined time and a case where a difference between the first time and the second time is equal to or longer than a threshold value, the control unit executes the determination process.

Thus, the determination process is not performed when it is not required. Therefore, both the user's convenience and processing efficiency can be enhanced.

(9) Preferably, in a case where the on-vehicle control device is an on-vehicle control device for which traveling of the vehicle is not permitted while the control program is being updated, the control unit executes the determination process.

Thus, the determination process is not performed during update of the control program in an on-vehicle control device for which traveling of the vehicle is allowed even during update of the control program. Therefore, both the user's convenience and processing efficiency can be enhanced.

(10) A control method included in the present embodiments is a method for controlling update of a control program in an on-vehicle control device in a control device according to any one of the above (1) to (9).

This control method provides the same effects as those of the control devices according to the above (1) to (9).

(11) A computer program included in the present embodiments causes a computer to function as a control device according to any one of the above (1) to (9).

This computer program provides the same effects as those of the control devices according to the above (1) to (9).

DETAILED DESCRIPTION OF EMBODIMENTS

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program updating system according to an embodiment of the present disclosure.

As shown in FIG. 1, the program updating system of this embodiment includes vehicles 1, a management server 5, and a DL (download) server 6 which are communicable with each other via a wide-area communication network 2.

The management server 5 manages update information of each vehicle 1. The DL server 6 stores therein update programs. The management server 5 and a DL server 6 are operated by, for example, the automobile manufacturer of the vehicles 1, and are communicable with large numbers of vehicles 1 owned by users registered as members in advance.

Each vehicle 1 is provided with: an in-vehicle network (communication network) 4 including a plurality of ECUs 30 and a gateway 10 which are connected via in-vehicle communication lines; a wireless communication unit 15; and various on-vehicle devices (not shown) controlled by the respective ECUs 30.

A touch panel 40 is one of the on-vehicle devices. The touch panel 40 is an example of a display device and an input device. Instead of the touch panel 40, a display and a button may be used. One of the plurality of ECUs 30 is connected to the touch panel 40 and controls the touch panel 40.

The in-vehicle network 4 has a plurality of in-vehicle communication lines, and includes a plurality of communication groups, each consisting of a plurality of ECUs 30, which are bus-connected to the respective in-vehicle communication lines. The gateway 10 relays communication between the communication groups. Therefore, the plurality of in-vehicle communication lines are connected to the gateway 10.

The wireless communication unit 15 is communicably connected to the wide-area communication network 2 such as a mobile phone network, and is connected to the gateway 10 via an in-vehicle communication line. The wireless communication unit 15 receives information from external devices such as the management server 5 and the DL server 6 via the wide-area communication network 2, and the gateway 10 transmits the information to the ECUs 30 via the in-vehicle communication line.

The gateway 10 transmits information obtained from the ECUs 30 to the wireless communication unit 15, and the wireless communication unit 15 transmits the information to the external devices such as the management server 5.

The ECUs 30 exchange information via the in-vehicle communication line.

As for the wireless communication unit 15 installed in the vehicle 1, devices such as a mobile phone, a smart phone, a tablet-type terminal, and a notebook PC (Personal Computer) possessed by the user are conceivable in addition to an on-vehicle exclusive communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program updating system shown in FIG. 1, the management server 5 and the DL server 6 are configured as separated servers. However, these servers 5 and 6 may be configured as a single server unit. Each of the management server 5 and the DL server 6 may be composed of a plurality of devices.

[Internal Configuration of Gateway]

Figure 2:
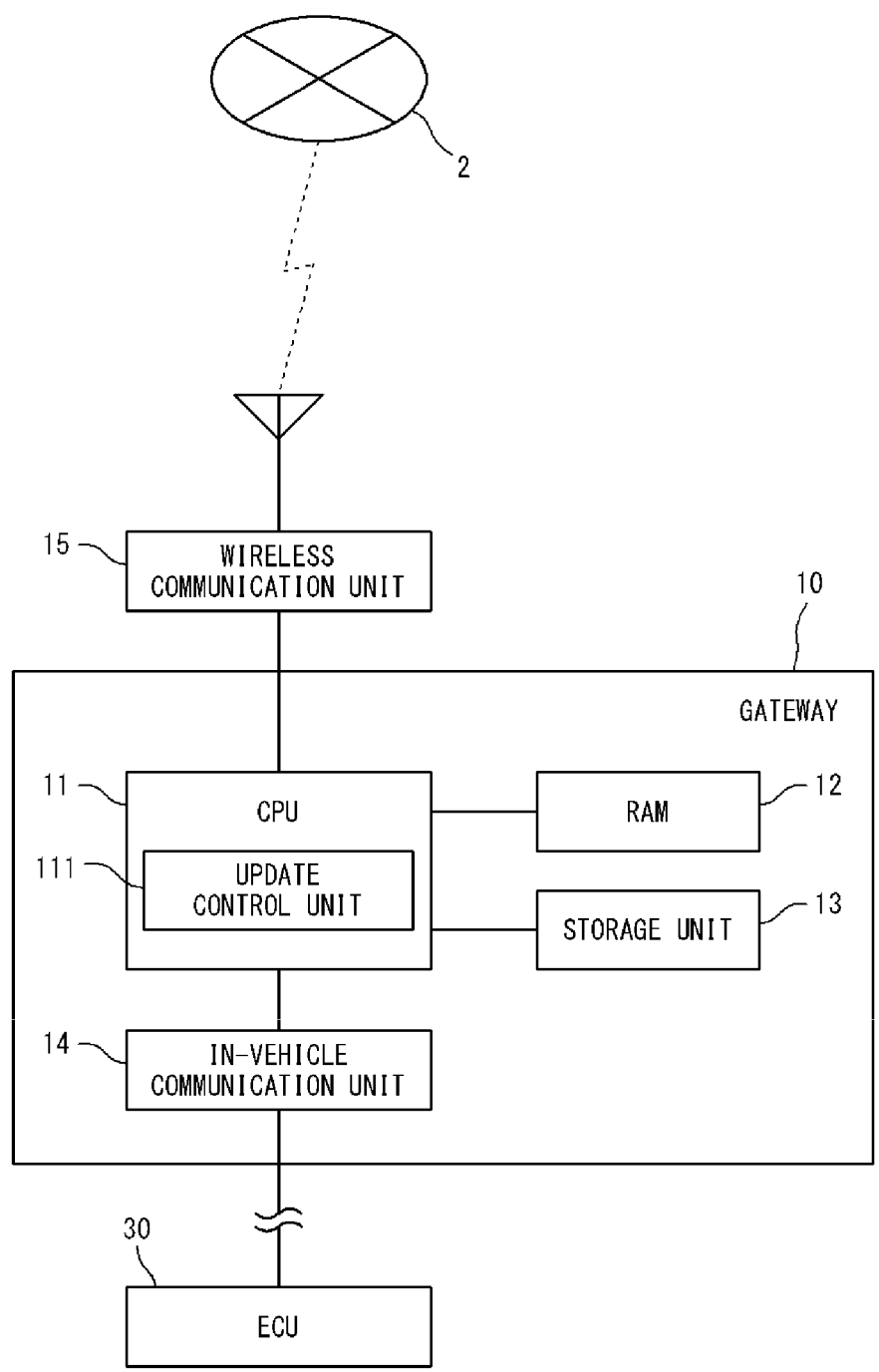
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. The gateway 10 is connected to the wireless communication unit 15 via the in-vehicle communication line. However, the gateway 10 and the wireless communication unit 15 may be configured as a single device.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission from a computer device such as a server computer.

In this aspect, the same applies to a computer program executed by a CPU 31 of the ECU 30 (refer to FIG. 3) described later, and a computer program executed by a CPU 51 of the management server 5 (refer to FIG. 4) described later.

In the following description, transfer (transmission) of data from a host device to a client device is also referred to as "download".

The storage unit 13 consists of a nonvolatile memory element, such as a flash memory or an EEPROM, and the like. The storage unit 13 stores therein programs to be executed by the CPU 11, data required for execution of the programs, and the like. The storage unit 13 also stores therein, for example, update programs, for the respective ECUs 30, which are received from the DL server 6 and are to be downloaded.

The plurality of ECUs 30 are connected to the in-vehicle communication unit 14 via the in-vehicle communication lines arranged in the vehicle 1. The in-vehicle communication unit 14 performs communication (also referred to as CAN communication) with the ECUs 30 according to the standard of CAN (Controller Area Network), for example. The communication standard adoptable by the in-vehicle communication unit 14 is not limited to CAN. Other standards such as CANFD (CAN with Flexible Data Rate), LIN (Local Interconnect Network), Ethernet (registered trademark), or MOST (Media Oriented Systems Transport: MOST is registered trademark) may be adopted. The plurality of in-vehicle communication lines may include communication lines based on different communication standards.

The in-vehicle communication unit 14 transmits information provided from the CPU 11 to target ECUs 30, and provides information received from the ECUs 30 to the CPU 11. The in-vehicle communication unit 14 may communicate with the ECUs 30 according to other communication standards that are used for the in-vehicle network 4, apart from the above communication standards.

The wireless communication unit 15 includes a wireless communication apparatus including an antenna and a communication circuit that executes transmission/reception of radio signals from the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay device inside the vehicle 1 may be adopted. This wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 become communicable with each other through a communication path consisting of the external device, the other communication device, the wired communication unit, and the gateway 10 in this order.

[Internal Configuration of ECU]

Figure 3:
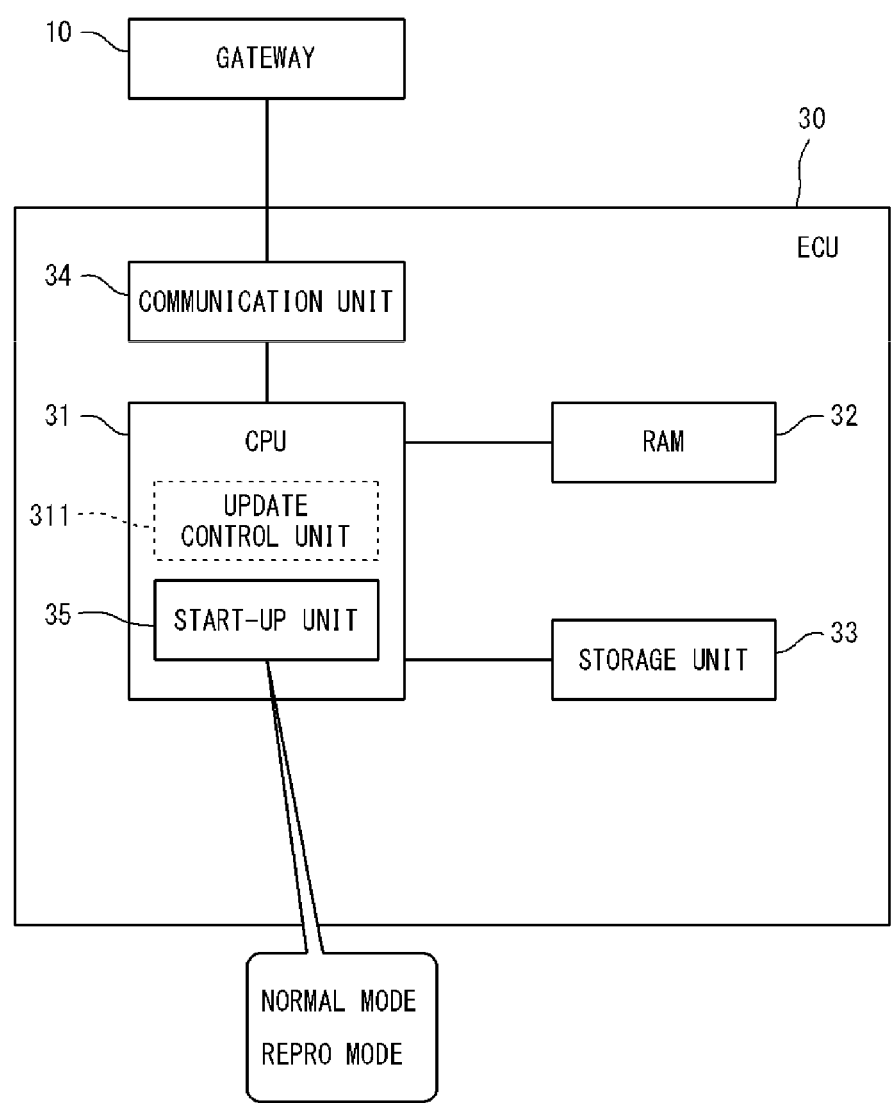
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECU 30 is an on-vehicle control device that independently controls a target device installed in the vehicle 1. Examples of the types of ECUs 30 include a power supply control ECU, an engine control ECU, a steering control ECU, and a door lock control ECU.

The CPU 31 controls the operation of a target device under the charge of the CPU 31, by reading out one or a plurality of programs previously stored in the storage unit 33 to the RAM 32 and executing the read program. The CPU 31 may also be a CPU representing a plurality of CPU groups, and a control to be performed by the CPU 31 may be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores therein programs to be read and executed by the CPU 31. Examples of information stored in the storage unit 33 include: a computer program that causes the CPU 31 to execute information processing for controlling target equipment that is an in-vehicle control target; and a control program that is data to be used in executing the program, such as parameters and map information.

The gateway 10 is connected to the communication unit 34 via the in-vehicle communication line arranged in the vehicle 1. The communication unit 34 communicates with the gateway 10 according to a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 according to other communication standards that are used for the on-vehicle network, apart from the above communication standards.

The CPU 31 of the ECU 30 includes a start-up unit 35 that switches the mode of control performed by the CPU 31 between a "normal mode" and a "reprogramming mode" (hereinafter also referred to as "repro mode").

The normal mode is a control mode in which the CPU 31 of the ECU 30 executes original control for the target device (e.g., engine control for a fuel engine or door lock control for a door lock motor).

The reprogramming mode is a control mode in which the CPU 31 updates the control program used for controlling the target device.

That is, the reprogramming mode is a control mode in which the CPU 31 performs erasing/overwriting of data of the control program from/on an ROM area in the storage unit 33. The CPU 31, only when it is in this control mode, can update the control program stored in the ROM area in the storage unit 33 to a new version.

In the reprogramming mode, when the CPU 31 writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

Updating a control program by using an update program, which has been downloaded from the DL server 6 to an ECU 30 via the gateway 10, is also referred to as "online update".

[Internal Structure of Management Server]

Figure 4:
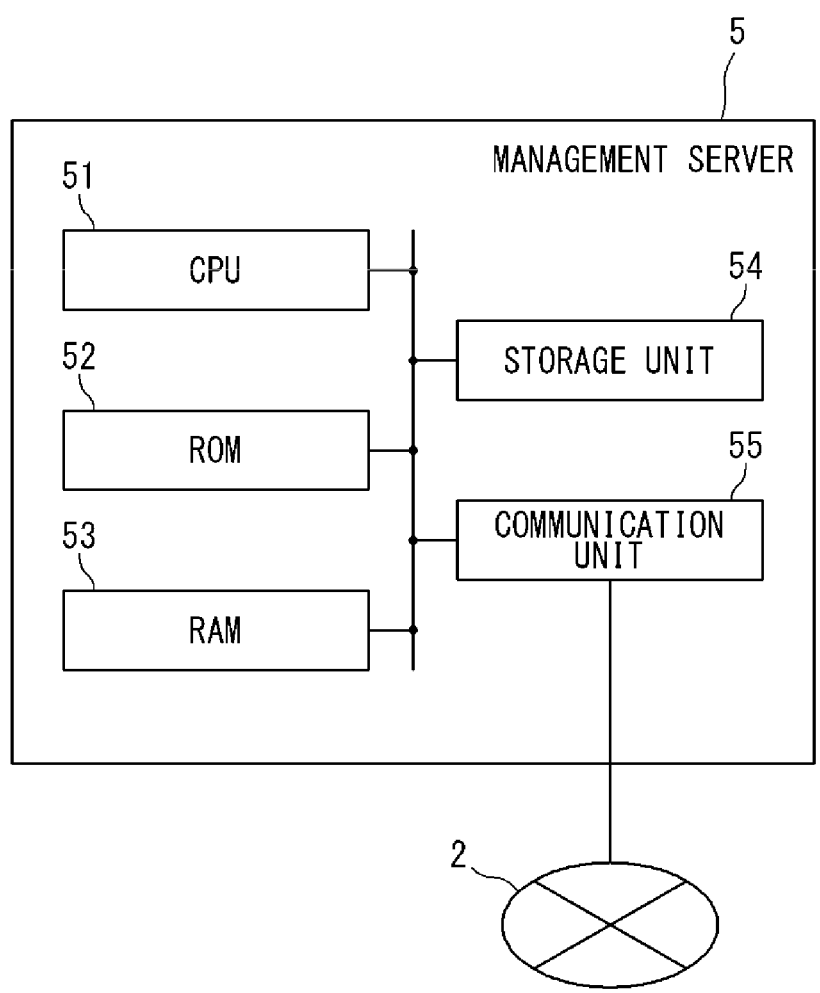
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read program, the CPU 51 controls the operation of each hardware component, and causes the management server 5 to function as an external device that is communicable with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process according to a predetermined communication standard. The communication unit 55 executes the communication process while being connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence]

Figure 5:
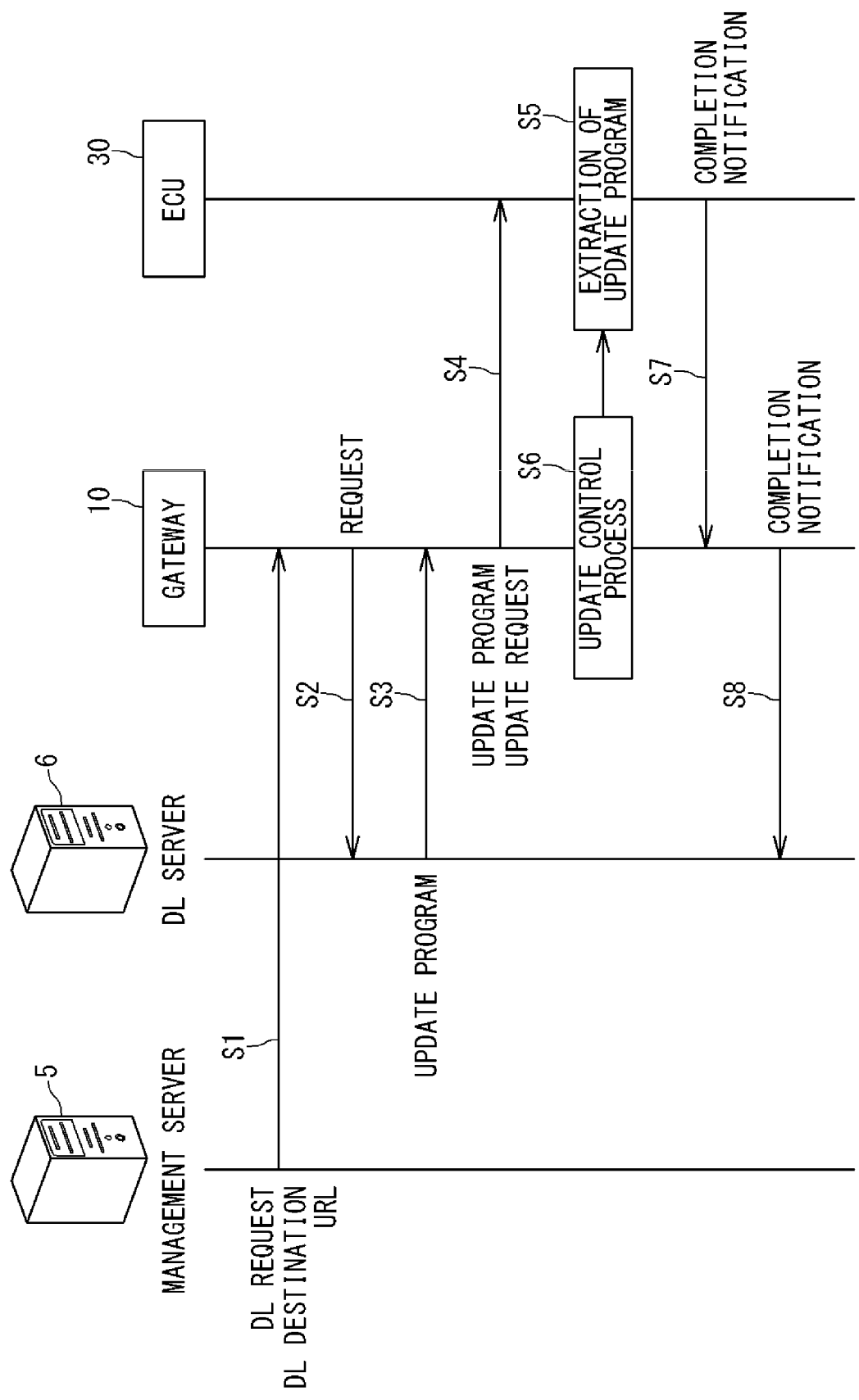
FIG. 5 is a sequence diagram showing an example of flow of online update of a control program which is executed in the program updating system.

FIG. 5 is a sequence diagram showing an example of a flow of online update of a control program, which is executed in the program updating system of the present embodiment. One or a plurality of update programs are stored in the DL server 6, and for example, the management server 5 determines a timing to update a control program of an ECU of the vehicle 1. The timing of update may be set by, for example, the automobile manufacturer of the vehicle 1.

A control program includes not only the program itself but also data such as parameters and map information to be used in executing the program. The term "control program" represents the program and the data. Therefore, an update program includes not only the program for updating a program but also data for updating the data to be used in executing the program.

When a timing to update the control program has arrived, the management server 5 notifies the gateway 10 of the corresponding vehicle 1 of the update (step S1). In step 1, information for update, such as a destination URL of the update program and the size of the update program, is transmitted together with a download request from the management server 5 to the gateway 10.

Upon receiving the notification of update from the management server 5, the gateway 10 relays the update program to be downloaded from the DL server 6 to an ECU (hereinafter referred to as "target ECU") whose control program is to be updated. That is, based on the information for update, the gateway 10 sends a request to the DL server 6 to download the update program (step S2).

Upon receiving the download request from the gateway 10, the DL server 6 transfers (relays), to the gateway 10, the update program to be downloaded, and requests update of the control program (step S3).

The gateway 10 downloads the update program, transfers the update program to the target ECU 30, and requests update of the control program (step S4). The gateway 10 may transfer the update program, upon receiving permission of update from a user.

The target ECU 30, which has received the update program, extracts the update program in response to the request from the gateway 10, and updates the control program (step S5). The gateway 10 is an example of a control device that controls the update process in the target ECU 30. The gateway 10 instructs the target ECU 30 to update the control program, and executes an update control process (step S6). The update control process will be described later.

When update of the control program is completed, the target ECU 30 notifies the gateway 10 of completion of update (step S7). Upon receiving this notification, the gateway 10 notifies the DL server 6 of completion of update (step S8).

[Functional Configuration of Gateway]

With reference to FIG. 2, the CPU 11 of the gateway 10 includes an update control unit 111 which is a function for executing the update control process. This function is implemented by the CPU 11 when the CPU 11 reads out one or a plurality of programs stored in the storage unit 13 and executes the read program. However, at least a part of this function may be implemented by hardware such as an electronic circuit.

The update control process includes an acquisition process, a determination process, and a control process. The function of the CPU 11 represented by the update control unit 111 (hereinafter this function is referred to as "update control unit 111") executes the acquisition process, the determination process, and the control process.

(Acquisition Process)

The acquisition process is a process of acquiring: an update completion time (first time) X which is a time period from the present time to when the update process for the target ECU 30 is completed; and a rollback time (second time) Y which is a time period from the present time to when rollback to the control program before update (i.e., the original control program) is completed.

FIG. 6A to FIG. 6C are diagrams for explaining the update completion time X and the rollback time Y, and each diagram schematically shows the state of a region 331 which is provided in the storage unit 33 of the ECU 30 and in which the control program to be executed by the CPU 31 is stored. FIG. 6A is a schematic diagram showing the state of the region 331 at the present time, and shows the state where an already-written region 331a, in which the new-version (updated) control program has been written, has a data size H1.

FIG. 6B shows the state where writing of the new-version control program has been completed, and shows the state where the already-written region 331a has reached a data size H2 of the new-version control program. The update completion time (first time) X corresponds to time T1 in which the already-written region 331a reaches the data size H2 from the data size H1.

FIG. 6C shows the state where writing of the new-version control program is interrupted at the time when the new-version control program has been written up to the data size H1 shown in FIG. 6A and then rollback is performed to the old-version (pre-update) control program. The old-version control program is written over the region 331 in the state shown in FIG. 6A, and when the rollback is completed, the already-written region 331a reaches a data size H3 of the old-version control program. The rollback time (second time) Y corresponds to time T2 in which the already-written region 331a reaches the data size H3 of the old-version control program from the data size 0.

In the case where the old-version control program is transferred from the gateway 10 to the target ECU 30 in advance of the rollback, the rollback time (second time) Y is equal to a time obtained by adding, to time T2 shown in FIG. 6C, time t required for transfer of the old-version control program from the gateway 10 to the target ECU 30 (i.e., Y=T2+t).

The acquisition process is a process of calculating the update completion time X and the rollback time Y, for example. The update control unit 111 calculates the update completion time X, based on the data size of a part (unwritten region), of the new-version control program, which is not written in the region 331, and on the writing capability of the target ECU 30. In addition, the update control unit 111 calculates the rollback time Y, based on the size of the old-version control program and on the writing capability of the target ECU 30.

In another example, the acquisition process may be a process of acquiring the update completion time X and the rollback time Y from the management server 5.

(Determination Process)

The determination process is a process of comparing the update completion time X with the rollback time Y, and determining whether or not rollback is necessary, based on the comparison result.

According to the result of the comparison, when the update completion time X is longer than the rollback time Y (X>Y), the update control unit 111 determines that rollback is necessary. When the rollback time Y is equal to or longer than the update completion time X (X≤Y), the update control unit 111 determines that rollback is not necessary.

(Control Process)

The control process is a process of controlling update of the control program in the target ECU 30, according to the determination result. When the determination result is that rollback is necessary, the update control unit 111 causes the touch panel 40 as a user interface to display the update completion time X and the rollback time Y. For this purpose, the update control unit 111 generates a frame that is information to be transmitted through CAN communication. This frame includes data indicating the update completion time X and the rollback time Y The CPU 11 causes the in-vehicle communication unit 14 to transmit this frame to the ECU 30 that controls the touch panel 40.

When an instruction operation of instructing a rollback process is performed on the touch panel 40, the in-vehicle communication unit 14 receives a frame indicating the instruction operation from the ECU 30 that controls the touch panel 40. When the in-vehicle communication unit 14 has received this frame, the update control unit 111 generates a frame indicating an instruction of execution of rollback to the target ECU 30. The CPU 11 causes the in-vehicle communication unit 14 to transmit this frame to the ECU 30 that controls the touch panel 40. This frame may include an old-version update program. Thus, rollback to the old-version update program is performed in the target ECU 30.

[Update Control Process]

Figure 7:
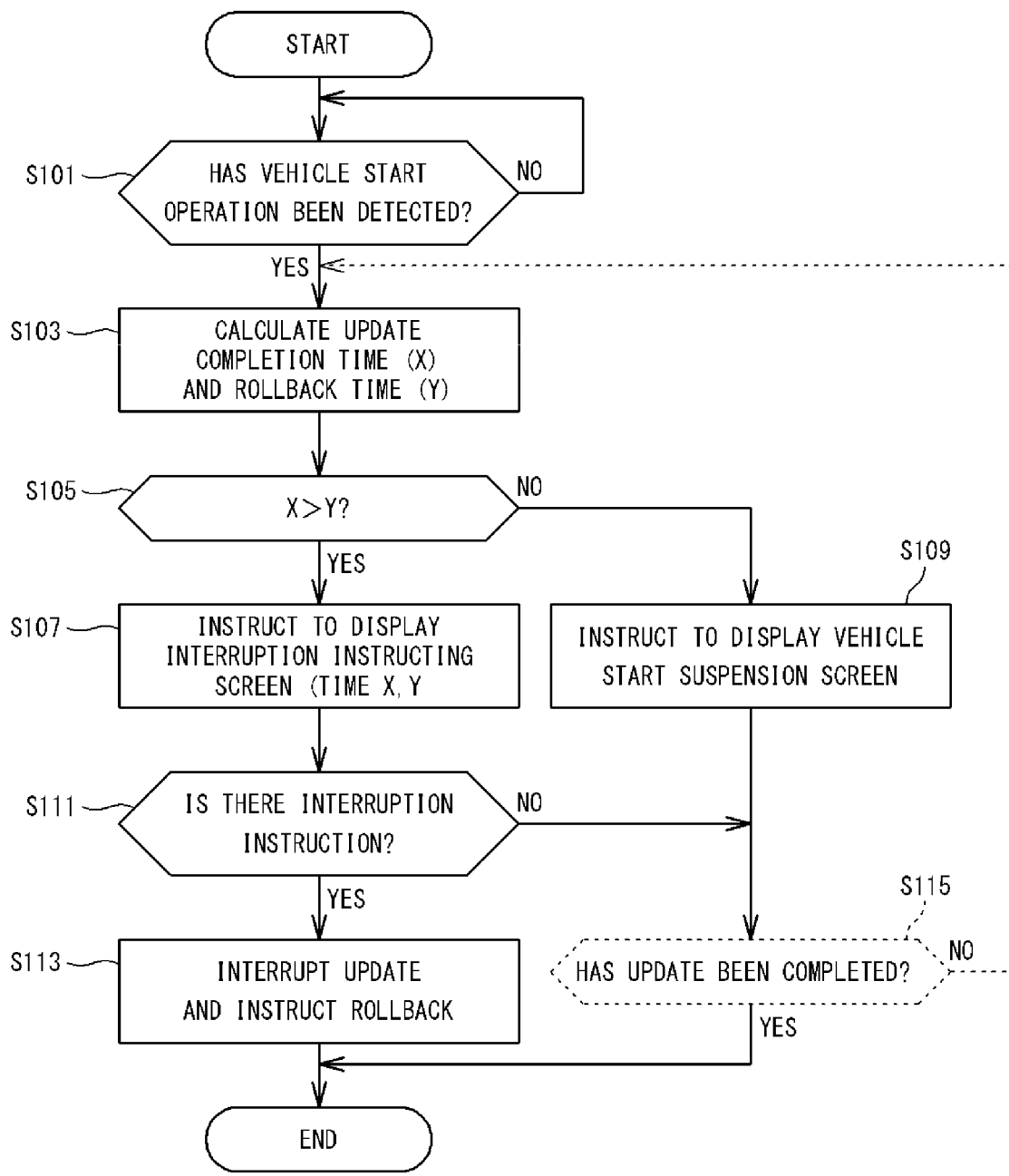
FIG. 7 is a flowchart showing the specific content of an update control process in the program updating system according to the first embodiment.

FIG. 7 is a flowchart showing a specific example of the update control process in the program updating system according to the first embodiment. The process shown in the flowchart of FIG. 7 is executed when the CPU 11 of the gateway 10 implements the function of the update control unit 111 by reading out one or a plurality of programs stored in the storage unit 13 onto the RAM 12 and executing the read program. The process shown in FIG. 7 is started after the gateway 10 has transmitted the update program to the target ECU 30 and requested update of the control program (after step S4 in FIG. 5). The process shown in FIG. 7 is ended when the update process has been completed in the target ECU 30 or when rollback to the pre-update control program has been performed.

With reference to FIG. 7, the CPU 11 monitors a frame received from an ECU that controls engine start, thereby detecting that a vehicle start operation has been performed. The vehicle start operation is a user operation for causing the vehicle 1 to start. For example, the user operation is an operation of pressing down a button for instructing engine start. When the target ECU 30 is in the repro mode, the gateway 10 does not permit starting of the vehicle 1. Therefore, even when a vehicle start operation has been detected, if the target ECU 30 is updating the control program, the user may not be able to promptly start the vehicle 1 although he/she desires to start the vehicle 1.

Upon detecting a vehicle start operation (YES in step S101), the CPU 11 acquires the update completion time X and the rollback time Y through calculation, for example (step S103).

When the update completion time X is longer than the rollback time Y (YES in step S105), the CPU 11 determines that rollback is necessary. Therefore, the CPU 11 causes the in-vehicle communication unit 14 to output, to the ECU 30 that controls the touch panel 40, an instruction that causes the touch panel 40 to display a screen (interruption instructing screen) for instructing rollback in the target ECU 30 while presenting the update completion time X and the rollback time Y. At this time, the CPU 11 causes the update completion time X and the rollback time Y calculated in step S103 to be transmitted to the ECU 30 that controls the touch panel 40. Thus, the interruption instructing screen is displayed on the touch panel 40 (step S107).

Figure 8:
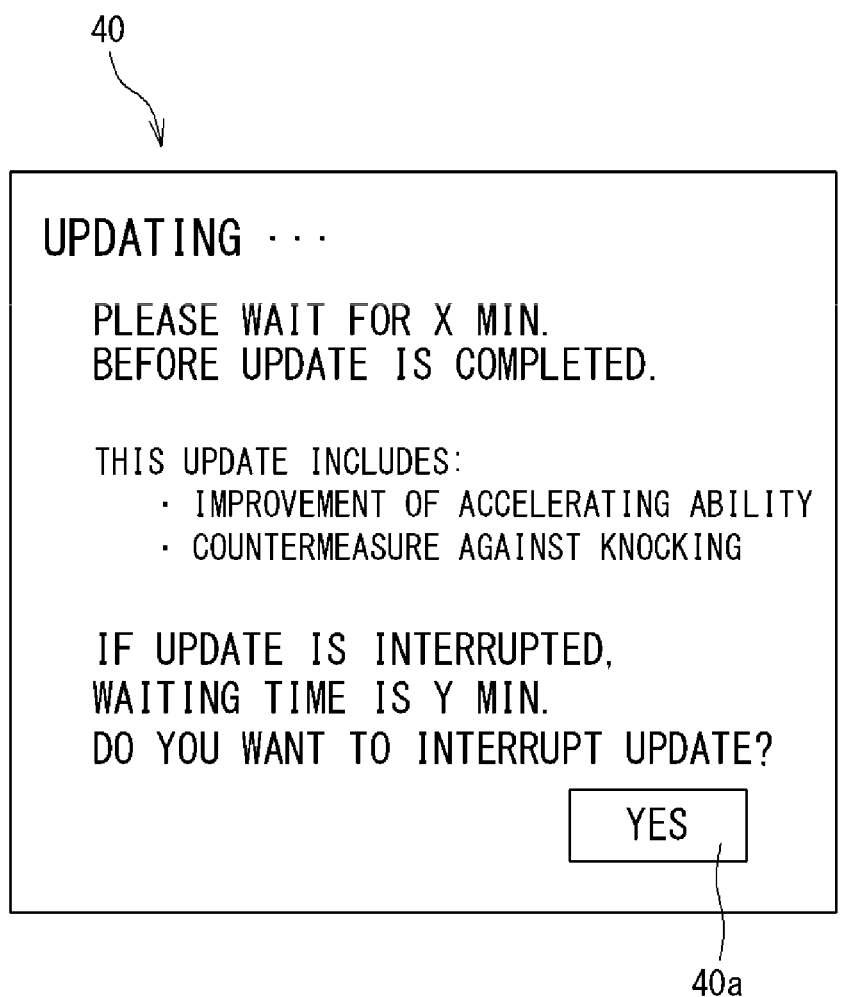
FIG. 8 is a schematic diagram showing a specific example of an interruption instructing screen.

FIG. 8 is a schematic diagram showing a specific example of the interruption instructing screen. With reference to FIG. 8, the interruption instructing screen includes, in addition to display of the update completion time X and rollback time Y, a button 40a for instructing interruption of the update process. Thus, the user can determine whether or not rollback is necessary, with reference to the update completion time X and the rollback time Y.

When the button 40a is selected on the interruption instructing screen shown in FIG. 8, the in-vehicle communication unit 14 receives, from the ECU 30 that controls the touch panel 40, a signal indicating the instruction operation. In this case (YES in step S111), the CPU 11 causes the in-vehicle communication unit 14 to transmit an instruction of rollback execution to the target ECU 30 (step S113). Thus, rollback is executed in the target ECU 30.

When the rollback time Y is equal to or longer than the update completion time X (NO in step S105), the CPU 11 determines that rollback is not necessary. Therefore, the CPU 11 does not execute the control in step S113. That is, rollback is not instructed to the target ECU 30. Even in the case where the update completion time X is longer than the rollback time Y (YES in step S105) and the CPU 11 determines that rollback is necessary, if the aforementioned instruction operation is not made (NO in step S111), the CPU 11 does not cause the in-vehicle communication unit 14 to transmit an instruction of rollback to the target ECU 30. Thus, the update process is continued in the target ECU 30.

Preferably, when the control in step S113 is not executed, that is, when the update process is continued in the target ECU 30, the CPU 11 causes the in-vehicle communication unit 14 to transmit, to the ECU 30 that controls the touch panel 40, an instruction that causes the touch panel 40 to display a screen (vehicle start suspension screen) for informing the user that the control program is being updated in the target ECU 30 and therefore vehicle start should be suspended.

Figure 9:
FIG. 9 is a schematic diagram showing a specific example of a vehicle start suspension screen.

FIG. 9 is a schematic diagram showing a specific example of the vehicle start suspension screen. With reference to FIG. 9, the vehicle start suspension screen includes, for example, a display of a message such as "Please do not start the vehicle because the vehicle is in the middle of updating". Preferably, as shown in FIG. 9, the vehicle start suspension screen includes a display of the update completion time X. Thus, the user can know how long the vehicle start will be suspended.

Effect of First Embodiment

In the program updating system according to the first embodiment, the gateway 10 which functions as a control device determines whether or not rollback to the old-version control program in the target ECU 30 is necessary, based on the result of comparison between the update completion time X and the rollback time Y at the time when a vehicle start operation has been performed. Then, the gateway 10 controls the update process in the target ECU 30, based on the determination result or on the determination result and an instruction operation. Thus, after the vehicle start operation has been performed, either update of the control program or rollback to the old version, which will be completed earlier, is executed. Therefore, after the vehicle start operation has been performed, the vehicle 1 can be promptly brought into the state where it can travel. As a result, the request of the user who wants to start the vehicle 1 can be satisfied.

<Modification 1>

Note that the update completion time X varies depending on the size of the control program, the scale of update, and the update capability (writing capability) of the target ECU 30. When the update completion time X is extremely short (e.g., about a few seconds), determination as to whether or not rollback is necessary is not needed. Also, when a difference between the update completion time X and the rollback time Y is extremely small, determination as to whether or not rollback is necessary is not needed.

Therefore, when the CPU 11 of the gateway 10 has executed the update control process and calculated the update completion time X and the rollback time Y (acquisition process), the CPU 11 preferably compares the magnitudes of the times X and Y and/or a difference therebetween with threshold values stored in advance, and executes the determination process when the values are equal to or greater than the threshold values. When the values are less than the threshold values, the CPU 11 does not execute the determination process. This also applies to the second and subsequent embodiments described later.

Thus, only when vehicle start is suspended for a time equal to or longer than the threshold value from when a vehicle start operation is performed to when the vehicle 1 enters the state where it can travel or when the difference in time between update completion and rollback is equal to or greater than the threshold value, determination as to whether or not rollback is necessary is performed. Otherwise, the determination is not performed, that is, the update process is continued until completion. Thus, both the user's convenience and processing efficiency can be enhanced.

<Modification 2>

In the first embodiment, the update control process is performed to inhibit traveling of the vehicle 1 during execution of the update process in the target ECU 30. The plurality of ECUs 30 mounted in the vehicle 1 may include an ECU for which driving of the vehicle 1 is permitted even when the control program thereof is being updated. Examples of the ECU include an ECU for controlling an audio, and an ECU for controlling an air conditioner. In this case, the update control process is not necessary.

Therefore, preferably, the CPU 11 of the gateway 10 memorizes the ECUs that need (or do not need) the update control process in advance, and executes the update control process when the target ECU 30 is an ECU that needs the update control process. Otherwise, the CPU 11 does not execute the update control process. This also applies to the second and subsequent embodiments described later. Thus, both the user's convenience and processing efficiency can be enhanced.

Second Embodiment

The update completion time X changes (reduces) as the update process advances in the target ECU 30. Therefore, in the update system according to the second embodiment, the CPU 11 of the gateway 10 which functions as a control device executes a process of step 115 indicated by dotted lines in FIG. 7.

With reference to FIG. 7, in the second embodiment, in the case where the CPU 11 of the gateway 10 does not perform the control in step S113, the CPU 11 repeats the operation from step S103 at a predetermined timing until the update process in the target ECU 30 is completed (NO in step S115). Thus, when the update completion time X is longer than the rollback time Y, the interruption instructing screen shown in FIG. 8 is updated every time the operation from step S103 is repeated.

Further, in the case where the rollback time Y is equal to or longer than the update completion time X and the update process in the target ECU 30 is continued, the vehicle start suspension screen shown in FIG. 9 is updated every time the operation from step S103 is repeated. Every time the display of the vehicle start suspension screen is updated or every time the display of the interruption instructing screen is updated, the update completion time X in the screen is shortened.

In the case where the comparison result indicating that the update completion time X is longer than the rollback time Y is obtained and no instruction operation is received, as the update process advances in the target ECU 30, the update completion time X is gradually shortened and may become shorter than the rollback time Y. If the operation from step S103 is repeated in this state, the comparison result indicating that the rollback time Y is equal to or longer than the update completion time X will be obtained. In this case (NO in step S105), the interruption instructing screen of FIG. 8 displayed on the touch panel 40 is switched to the vehicle start suspension screen of FIG. 9 (step S109). That is, even when determination of the CPU 11 at a certain point in time was that rollback was necessary because the update completion time X was longer than the rollback time Y, the CPU 11 determines that rollback is not necessary when the update completion time X has become equal to or shorter than the rollback time Y with progress of the update process in the target ECU 30.

Effect of Second Embodiment

In the program updating system according to the second embodiment, when the update process is continued in the target ECU 30, the update completion time X displayed on the touch panel 40 changes (reduces) as the update process in the target ECU 30 advances. Thus, the user, who is waiting for the vehicle 1 to be able to start without interrupting the update process, can know how much longer the vehicle start will be suspended.

Even in the case where the update completion time X is longer than the rollback time Y at the time when a vehicle start operation has been detected, an instruction of rollback is not accepted at the time when the update completion time X has become equal to or shorter than the rollback time Y with the progress of the update process in the target ECU 30. Thus, the vehicle 1 can be brought into the travelable state as soon as possible from when the vehicle start operation has been detected.

Third Embodiment

In the first and second embodiments, the gateway 10 which functions as a control device performs control to cause the target ECU 30 to execute rollback, in the case where the gateway 10 has determined that rollback is necessary because the update completion time X is longer than the rollback time Y at the time when the vehicle start operation has been detected, and an instruction operation has been detected. In another example, even without an instruction operation, the gateway 10 may perform control to cause the target ECU 30 to execute rollback, based on only the result of the determination process.

Figure 10:
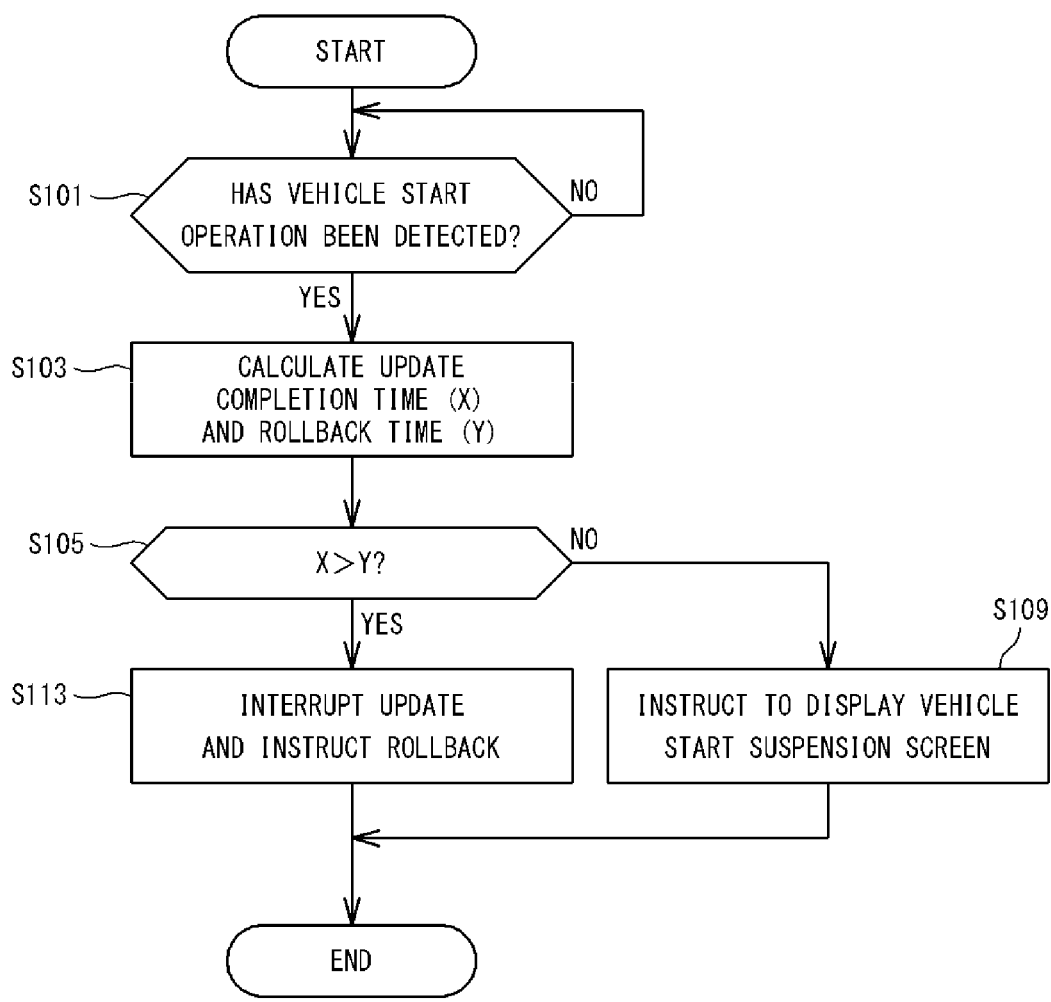
FIG. 10 is a flowchart showing the specific content of an update control process in a program updating system according to a third embodiment.

FIG. 10 is a flowchart showing the specific content of an update control process of the program updating system according to the third embodiment. The operations to which the same step numbers as in the flowchart of FIG. 7 are given are the same as those in the update control process in the program updating system according to the first embodiment.

With reference to FIG. 10, when the update completion time X is longer than the rollback time Y (YES in step S105), the CPU 11 determines that rollback is necessary (step S113). Then, the CPU 11 causes the in-vehicle communication unit 14 to transmit a rollback instruction to the target ECU 30. Thus, the target ECU 30 executes rollback to the old-version control program. In this case, preferably, the CPU 11 instructs the touch panel 40 to display a vehicle start suspension screen as shown in FIG. 9, whereby the rollback time Y is displayed. Thus, the user can know how long the vehicle start will be suspended.

When the rollback time Y is equal to or longer than the update completion time X (NO in step S105), the CPU 11 determines that rollback is not necessary, and does not execute the control in step S113. Thus, the update process in the target ECU 30 is continued. In this case, preferably, the CPU 11 causes the touch panel 40 to display the vehicle start suspension screen shown in FIG. 9. More preferably, the CPU 11 recalculates the update completion time X at a predetermined interval while the update process in the target ECU 30 is continued, and instructs update of the vehicle start suspension screen shown in FIG. 9. Thus, the user can know how long the vehicle start will be suspended in real time or almost in real time.

Effect of Third Embodiment

In the program updating system according to the third embodiment, the gateway 10 which functions as a control device controls the update process in the target ECU 30 in accordance with the determination result based on comparison between the update completion time X and the rollback time Y at the time of the vehicle start operation. That is, in the program updating system according to the third embodiment, when a vehicle start operation (user operation) such as an instruction of engine start is performed after the control program updating process has been started in the target ECU 30, the update process in the target ECU 30 is automatically controlled. Thus, the request of the user who wants to start the vehicle 1 is satisfied, and a complicated user operation is dispensed with to improve the operability.

Fourth Embodiment

In the program updating system according to the first to third embodiments, the gateway 10 functions as a control device and executes the aforementioned update control process. However, the control device is not limited to the gateway 10. In another example, any of the ECUs 30 may function as a control device. In the program updating system according to the fourth embodiment, an ECU 30 that functions as a control device executes the update control process.

In this case, as shown in FIG. 3, the CPU 31 of the ECU 30 that functions as a control device includes an update control unit 311 corresponding to the aforementioned update control unit 111, as a function of executing the update control process. This function is implemented mainly by the CPU 31 when the CPU 31 reads out one or a plurality of programs stored in the storage unit 33 and executes the read programs. However, at least a part of the function may be implemented by hardware such as an electric circuit.

The disclosed feature is implemented by one or more modules. For example, the feature can be implemented by: hardware modules such as circuit elements, etc.; software modules defining processes that realize the feature; or a combination of the hardware modules and the software modules.

The disclosed feature may be provided as a program, which is a combination of one or more software modules, for causing a computer to execute the aforementioned operation. Such a program may be recorded in a computer-readable recording medium, such as a flexible disc, a CD-ROM (Compact Disk-Read Only Memory), an ROM, an RAM, a memory card, or the like adjunct to the computer, and provided as a program product. Alternatively, the program may be provided by being recorded in a recording medium such as a hard disk incorporated in the computer. The program may also be provided by being downloaded through a network.

The program according to the present disclosure may call up necessary modules in a predetermined array at a predetermined timing from among program modules provided as a portion of an operating system (OS) of a computer, and may cause processing to be executed. In this case, the modules are not included in the program itself, and the processing is executed in cooperation with the OS. The program according to the present disclosure also includes such a program including no modules.

The program according to the present disclosure may be provided by being incorporated in a portion of another program. In that case as well, modules included in the other program are not included in the program itself, and processing is executed in cooperation with the other program. The program according to the present disclosure also includes such a program incorporated in another program. A program product to be provided is installed in a program storage unit such as a hard disk, and then executed. The program product includes the program itself and a recording medium in which the program is recorded.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 server
10 gateway (control device)
11 CPU
12 RAM
13 storage unit
14 in-vehicle communication unit (communication unit)

15 wireless communication unit
30 ECU (on-vehicle control device)
31 CPU
32 RAM
33 storage unit
34 communication unit
35 start-up unit
40 touch panel
40a button
51 CPU
52 ROM
53 RAM
54 storage unit
55 communication unit
111 update control unit (control unit)
331 region
331a already-written region
311 update control unit (control unit)

The invention claimed is:

1. A control device comprising:
a communication unit configured to communicate with an on-vehicle control device via an in-vehicle communication line; and
a control unit configured to control the communication unit, wherein
the control unit executes
an acquisition process of acquiring a first length of time and a second length of time described below, and
a determination process of determining, based on a result of comparison between the first length of time and the second length of time that have been acquired, whether or not rollback to an old version of a control program is necessary in the on-vehicle control device that is updating the control program;
wherein the first length of time is an amount of time from a present time in which the control program is being updated to when the update would be completed; and
wherein the second length of time is an amount of time from the present time to when the rollback to the old version of the control program would be completed.

2. The control device according to claim 1, wherein
in a case where the first length of time is longer than the second length of time, the control unit determines that the rollback is necessary.

3. The control device according to claim 2, wherein
the communication unit is able to receive a signal that indicates a user operation performed on a user interface, and
in a case where the result of the determination process is that the rollback is necessary, the control unit further causes the communication unit to transmit an instruction that causes the on-vehicle control device to execute the rollback, subject to the content of the user operation.

4. The control device according to claim 3, wherein
the user operation includes a vehicle start operation of instructing start of the vehicle during update of the control program, and
the control unit executes the determination process when the vehicle start operation has been performed, and determines that the rollback is necessary, in a case where the first length of time at the time point when the vehicle start operation has been performed is longer than the second length of time.

5. The control device according to claim 4, wherein
the user operation further includes an instruction operation of instructing the rollback, and in a case where the result of the determination process is that the rollback is necessary and the instruction operation has been performed, the control unit causes the communication unit to transmit an instruction that causes the on-vehicle control device to execute the rollback.

6. The control device according to claim 2, wherein
the communication unit is able to transmit information for display to a display device, and
the control unit causes the communication unit to transmit an instruction that causes the display device to display the first length of time.

7. The control device according to claim 6, wherein
in a case where the first length of time is longer than the second length of time, the control unit causes the communication unit to transmit an instruction that causes the display device to display the first length of time.

8. The control device according to claim 1, wherein
in at least one of a case where each of the first length of time and the second length of time is equal to or longer than a predetermined length of time and a case where a difference between the first length of time and the second length of time is equal to or longer than a threshold value, the control unit executes the determination process.

9. The control device according to claim 1, wherein
in a case where the on-vehicle control device is an on-vehicle control device for which traveling of the vehicle is not permitted while the control program is being updated, the control unit executes the determination process.

10. A control method for controlling update of a control program in an on-vehicle control device by a control device that communicates with the on-vehicle control device via an in-vehicle communication line, the method comprising:
acquiring a first length of time and a second length of time described below; and
determining, based on a result of comparison between the first length of time and the second length of time that have been acquired, whether or not rollback to an old version of the control program is necessary in the on-vehicle control device that is updating the control program;
wherein the first length of time is an amount of time from a present time in which the control program is being updated to when the update would be completed; and
wherein the second length of time is an amount of time from the present time to when the rollback to the old version of the control program would be completed.

11. A non-transitory computer readable storage medium storing a computer program configured to cause a computer to function as a control device that communicates with an on-vehicle control device via an in-vehicle communication line, the computer program causing the computer to function as:
a control unit configured to execute
an acquisition process of acquiring a first length of time and a second length of time described below, and
a determination process of determining, based on a result of comparison between the first length of time and the second length of time that have been acquired, whether or not rollback to an old version of a control program is necessary in the on-vehicle control device that is updating the control program;

wherein the first length of time is an amount of time from a present time in which the control program is being updated to when the update would be completed; and wherein the second length of time is an amount of time from the present time to when the rollback to the old version of the control program would be completed.

* * * * *